May 19, 1959 H. HUBER 2,887,238
CONVERTIBLE BOAT TRAILER
Filed May 25, 1956 2 Sheets-Sheet 1
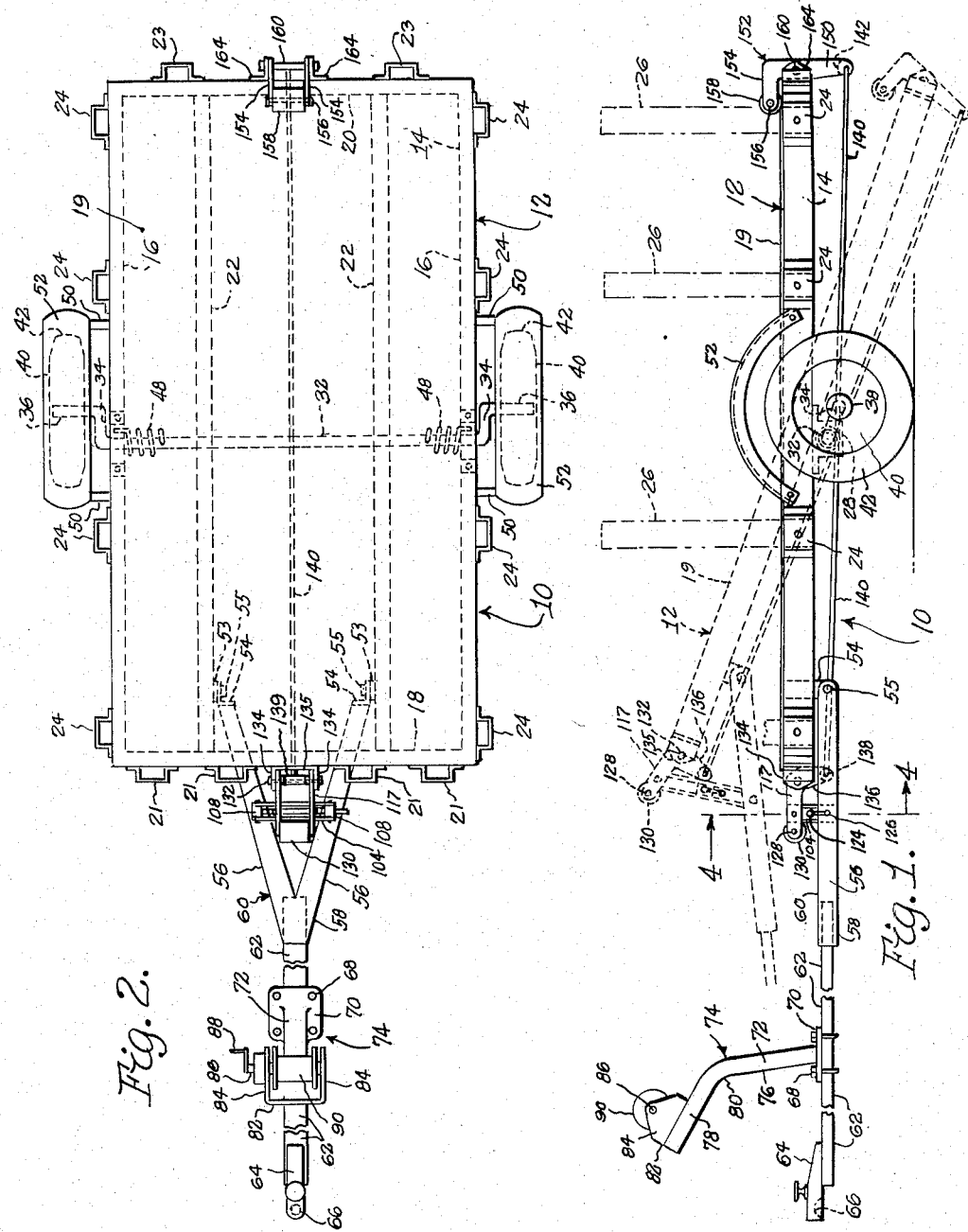
INVENTOR.
Henry Huber
BY Barthel + Bugbee
Attys

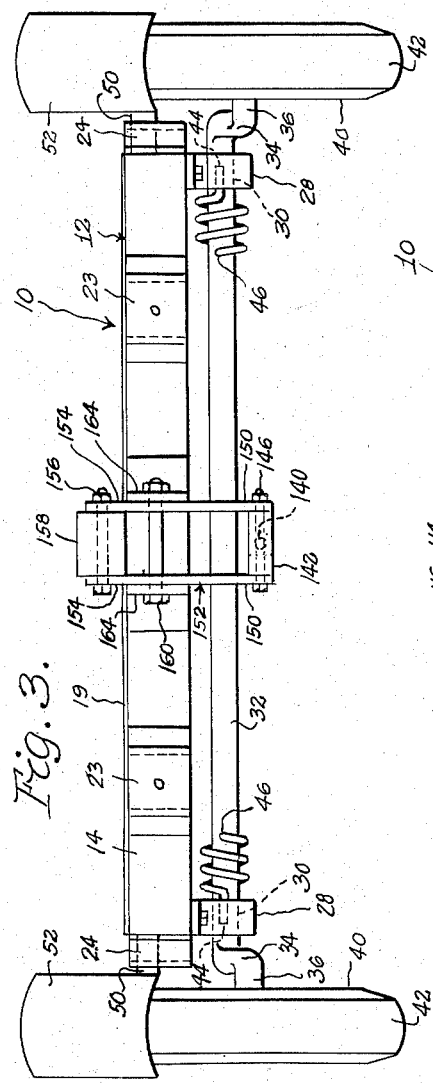
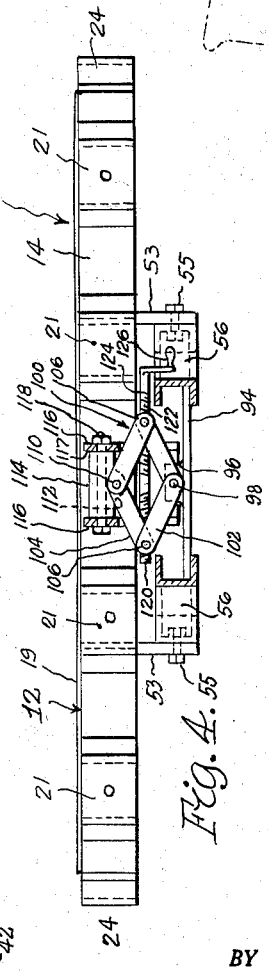
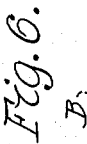
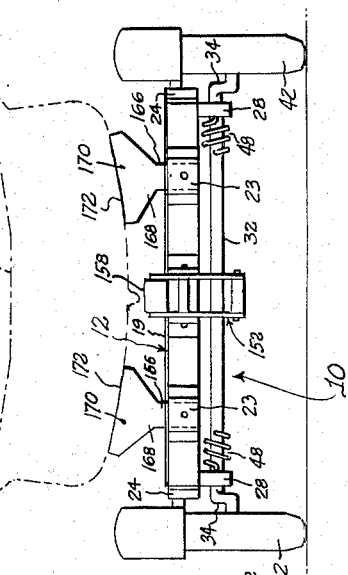
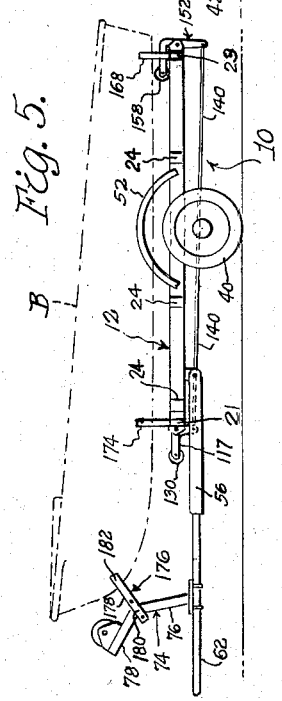

United States Patent Office 2,887,238
Patented May 19, 1959

2,887,238

CONVERTIBLE BOAT TRAILER

Henry Huber, De Land, Fla.

Application May 25, 1956, Serial No. 587,310

3 Claims. (Cl. 214—506)

This invention relates to convertible boat trailers.

One object of this invention is to provide a universal trailer which is adapted for general utility in hauling a wide variety of loads or cargoes, such as household goods, building material, camping and hunting equipment, livestock, boats, power lawnmowers and other wheeled equipment and the like, brackets being provided around the edge of the bed for the insertion of stakes in order to retain the load.

Another object is to provide a universal trailer of the foregoing character wherein loading and unloading of the cargo carried by the trailer is facilitated by the provision of a tilting bed which is raised and lowered and held in any desired position by a jack.

Another object is to provide a universal trailer of the foregoing character wherein loading and unloading is further facilitated by means of a roller or rollers which are automatically raised and lowered in response to the tilting or leveling respectively of the bed, thereby lifting the load, such as a boat, off the bed or supports in order to enable it to slide downward more easily into the water or rise more easily from the water.

Another object is to provide a universal trailer of the foregoing character wherein a detachable winch unit is provided for further facilitating loading and unloading of the cargo.

Other objects and advantages of the invention will become apparent during the course of the following description of the accompanying drawings, wherein:

Figure 1 is a side elevation of a trailer according to one form of the invention, with the tilted position of the bed shown in dotted lines and with the optionally insertable stakes also shown in dotted lines;

Figure 2 is a top plan view of the trailer shown in Figure 1;

Figure 3 is a rear elevation of the trailer shown in Figures 1 and 2, on an enlarged scale;

Figure 4 is a vertical section, mainly in front elevation, taken along the line 4—4 in Figure 1;

Figure 5 is a side elevation of the trailer of Figures 1 to 4 inclusive, fitted with supports for temporary conversion to hauling a boat, which is shown in dotted lines; and Figure 6 is a rear elevation, upon an enlarged scale, of the trailer shown in Figure 5.

Referring to the drawings in detail, Figures 1 to 4 inclusive show a universal trailer, generally designated 10, according to one form of the invention as including a bed or load-carrying structure 12 upon which various types of loads or cargoes may be carried and loaded or unloaded with ease by means of the improvements provided by the present law. The bed 12 consists of a frame 14 with side members 16, forward and rearward end members 18 and 20, and laterally-spaced intermediate longitudinal members 22 disposed between the side members 16 and parallel thereto. The frame 14 with its various members is preferably constructed from channel iron or steel and welded together, and supports a floor 19 of wood or sheet metal secured thereto. Secured at intervals around the periphery of the frame 14 are spaced front and rear stake brackets 21 and 23 respectively, and stake side brackets 24 adapted for the reception of stakes 26 (Figure 1) or, as will be discussed below in connection with Figures 5 and 6, for special supports or pads for carrying specialized loads, such as boats.

Bolted or otherwise secured to the side members 16 (Figure 3) are bearing brackets 28 which are aligned with one another and bored as at 30 to rotatably receive an axle 32 having crank portions 34 at its opposite ends terminating in parallel stub axles 36 upon which the hubs 38 of wheels 40 are rotatably mounted. The wheels 40 are provided with conventional pneumatic tires 42 for resiliently supporting the load. The bearing brackets 28 and axle 32 are drilled as at 44 and 46 respectively (Figure 3) to receive the opposite ends of torsion coil springs 48. Fender brackets 50 are also secured to the side members 16 forwardly and rearwardly of the wheels 40 and project laterally therefrom. Mounted upon the fender brackets 44 are fenders or mud guards 52 of arcuate form.

Welded or otherwise secured to the inner sides of the intermediate longitudinal frame members 22 (Figures 2 and 4) are depending bars 53 carrying pivot bolts 55 on which are pivotally mounted angle brackets 54 which in turn are welded or otherwise secured to the rearward ends of channel bars 56. The latter converge to a junction 58 at their forward ends, where they are welded or otherwise secured to one another and form a V-shaped draft structure 60. Mounted in and welded, bolted or otherwise secured to the forward end or junction 58 of the V-shaped draft structure 60 is the rearward end of a tongue 62, the forward end of which has welded or otherwise secured thereto a coupling bracket 64 which at its forward end contains a ball socket 66 for the reception of the coupling ball on a conventional trailer coupling device or "hitch."

Bolted or otherwise secured as at 68 to the tongue 62 intermediate the rearward and forward ends thereof is the base 70 of the upstanding post 72 of a detachable winch unit, generally designated 74. The post 72 is welded or otherwise secured at its lower end to the base plate 70 and has lower and upper arms 76 and 78 which are bent relatively to one another as at 80. Welded or otherwise secured to the upper arm 78 on its upper side is an approximately U-shaped winch mounting bracket 82 with parallel upstanding sides 84. The latter are drilled in alignment to receive the opposite ends of a winch axle 86 which terminates in a hand crank 88. Mounted on the axle 86 between the sides 84 is a winch or winding drum 90, and mounted on the sides 84 adjacent the crank 88 is a ratchet housing 92 containing a pawl and ratchet wheel (not shown) by which the axle 86 and drum 90 may be locked in any desired position.

Welded or otherwise secured to the channel bars 56 and extending transversely therebetween (Figure 4) is a horizontal bar 94 to which is secured a pair of spaced upstanding lugs 96 carrying pivot bolts or pins 98 pivotally supporting the lower end of a raising and lowering jack 100. The latter consists of pairs of lower and upper links 102 and 104 respectively, the lower links 102 being pivotally mounted on the bolts 98 and pivotally connected as at 106 (Figure 4) to the upper links 104 and also to transversely-extending nut blocks 108 (Figure 2). The upper end of the upper links 104 are pivotally connected to pivot bolts or pins 110 which also pass through depending lugs 112 welded or otherwise secured to the underside of a pivot block 114 (Figure 4). The pivot block 114 is mounted between two parallel arms 116 of bellcrank levers 117, and it and the arms 116 are drilled to receive a pivot bolt 118 by which the block 114 is rockably mounted between the arms 116. Threaded into the nut blocks 108 are the oppositely-threaded portions 120 and 122 respectively of a screw-shaft 124 carrying a hand crank 126 at one end thereof.

The arms 116 of the bellcrank levers 117 at their outer ends are drilled to receive the axle 128 of a forward load-supporting roller 130. The bellcrank levers 117 are pivotally mounted on pivot bolts 132 on the spaced sides 134 of a U-shaped bracket 135 (Figure 2) which is welded, bolted or otherwise secured to the front member 18 of the frame 14. The remaining arms 136 of the bellcrank levers 117 project downward and at their lower ends are drilled to receive a pivot bolt 138 which passes through the longitudinally-bored cross bar 139 secured to the forward end of a connecting rod 140. The connecting rod 140 at its rearward end is similarly provided with a longitudinally-bored cross bar 142 (Figure 3). A pivot bolt 146 passes through the cross bar 142 and also through the lower ends of the lower arms 150 of a pair of laterally-spaced bent levers 152. The latter have upper arms 154 which are drilled at their outer ends to receive an axle 156 upon which a rearward load-supporting roller 158 is rotatably mounted. The bent levers 152 are pivotally mounted upon a pivot bolt 160 which passes through spaced angle brackets 164. The latter are welded or otherwise secured to the rearward frame end member 20.

The jack 100 has been shown for purposes of illustration and not limitation, to be of the so-called scissors jack type because this type of jack has an exceptionally long extension between its raised and lowered positions, and therefore collapses into a very small and very low space. It will be understood, however, that other types of jack may be substituted for the scissors jack 100, such as a vertical screw jack or a hydraulic jack. Such jacks are conventional and their details form no part of the present invention.

In Figures 5 and 6, the trailer 10 is shown as converted to the carrying of a boat B. This is accomplished by inserting the lower ends 166 of a pair of rearward supports or pads 168 in the end stake brackets 23, the pads 168 having widened heads 170 with arcuate upper surfaces 172 adapted to fit the hull of the boat B near the stern thereof. The forward portion of the hull of the boat B is similarly supported by forward supports or pads 174 similar to the rearward pads 168 and similarly fitting forward portion of the hull bottom. The lower ends of the forward pads 174, are inserted in the inner pair of the forward stake brackets 21 (Figure 5), i.e. the pair nearest the center line of the trailer. To prevent side sway at the bow of the boat B, there is additionally provided a strut 176 composed of a pair of bars 178, the forward ends of which are bent as at 180 and bolted together on opposite sides of the bent post 72 at approximately the junction 80 of its upper and lower arms 78 and 76. The strut 176 is inclined upward and rearward and has outwardly-bent rearward ends 182 forming an approximately V-shaped notch which receives the stem at the bow of the boat B.

In the operation of the invention, let it be assumed that a load, such as the boat B in Figures 5 and 6, is to be transported by the trailer 10 and that the boat B is on the ground or in the water. At the outset, the operator inserts the pads or supports 168 and 174 in their respective rearward and forward stake brackets 23 and 21 (Figures 5 and 6), ready to receive the hull of the boat B. He also mounts the strut 176 upon the bent post 72 in its upwardly-inclined position (Figure 5) so as to be ready to receive the stem of the boat B.

To load the boat B on the trailer, the operator rotates the hand crank 126 of the jack 100 to pull the screw blocks or nuts 108 toward one another, as shown in the dotted lines in Figure 1, raising the pivot block 114 relatively to the V-shaped structure 60 and tongue 62. At the same time, the upward motion of the pivot block 114 first swings the bellcrank levers 117 clockwise around their pivot bolts 132, causing the operating rod 140 to be pulled forward so as to similarly swing the bent levers 152 clockwise around their pivot bolts 160. This action swings the forward and rearward load-supporting rollers 130 and 158 respectively upward away from the floor 19 of the bed 14, as shown in the dotted lines in Figure 1. When the lower arms 150 of the bent levers 152 swing sufficiently far enough to engage the rear frame end member 20, they come to a halt, after which the further operation of the hand crank 126 in extending the jack 100 tilts the bed 14 around the axle 32 into the tilted dotted line position of Figure 1.

The operator, after preferably inserting the chocks (not shown) beneath the tires 42 of the wheels 40 in order to prevent accidental rolling of the trailer 10 during loading, then secures a cable, rope, chain or painter to the bow of the boat and winds the opposite end around the windlass drum 90 upon the windlass unit 74. By turning the hand crank 88, he then draws the boat out of the water or off the ground over the rearward roller 158 and up the incline formed by the floor 19 of the bed 14, the rope, cable or chain passing over the forward roller 130 onto the drum 90. The pawl and ratchet unit 92 prevents reverse rotation of the drum 90 while winding or hauling upon the boat B is taking place. When the boat has arrived at the desired location relatively to the bed 14, the operator, while maintaining the windlass drum 90 in its locked position by the pawl and ratchet unit 92, operates the hand crank 126 to collapse the jack 100 and cause the bed 14 of the trailer 10 to move downward from its dotted line position to its solid line position of Figure 1, namely from an inclined or tilted position to a horizontal position.

During the first part of the collapsing of the jack 100, the downward pull upon the bellcrank levers 117 swings them in a counterclockwise direction so as to move the forward load-supporting roller 130 downward below the level of the floor 19 of the trailer 14. This motion is transmitted through the connecting rod 140 to the rearward bent levers 152, similarly swinging them in a counterclockwise direction so as to move the rearward load supporting roller 156 downward against the floor 19 into its solid line position shown in Figure 1. The continued operation of collapsing the jack 100 then swings the bed 14 downward into the solid line position of Figure 1.

What I claim is:

1. A trailer for coupling to a draft vehicle, comprising a chassis structure including an axle with ground wheels thereon, a load-carrying structure pivotally mounted on said chassis structure for tilting relatively thereto upon a transverse horizontal axis, a draft structure connected to said load-carrying structure and having a coupling element thereon for coupling engagement with the draft vehicle, a load-carrying structure tilting device connecting said load-carrying structure to said draft structure, a retractible load support including a load-engaging roller, said load support being movably mounted on said load-carrying structure for movement relatively thereto between an upwardly-projected load-supporting position and a downwardly-retracted load-releasing position, and means connected to said load support and responsive to the tilting operation of said tilting device for moving said load support relatively to said load-carrying structure into and out of load-supporting engagement with the load.

2. A trailer for coupling to a draft vehicle, comprising a chassis structure including an axle with ground wheels thereon, a load-carrying structure pivotally mounted on said chassis structure for tilting relatively thereto upon a transverse horizontal axis, a draft structure connected to said load-carrying structure and having a coupling element thereon for coupling engagement with the draft vehicle, a load-carrying structure tilting device connecting said load-carrying structure to said draft structure, a retractible load support including a load-engaging roller and a load-supporting lever rotatably supporting said roller and movably mounted on said load-carrying structure for movement relatively thereto between an upwardly-projected load-supporting position and a downwardly-retracted load-releasing position, and means responsive to the tilting operation of said tilting device for moving said load support relatively to said load-carrying structure into and out of load-supporting engagement with the load.

3. A trailer for coupling to a draft vehicle, comprising a chassis structure including an axle with ground wheels thereon, a load-carrying structure pivotally mounted on said chassis structure for tilting relatively thereto upon a transverse horizontal axis, a draft structure connected to said load-carrying structure and having a coupling element thereon for coupling engagement with the draft vehicle, a load-carrying structure tilting device connecting said load-carrying structure to said draft structure, a plurality of longitudinally-spaced retractible load supports including load-engaging rollers, said load supports being movably mounted on said load-carrying structure, mechanism operatively interconnecting said load supports, and means responsive to the tilting operation of said tilting device for moving said load supports relatively to said load-carrying structure into and out of load-supporting engagement with the load.

References Cited in the file of this patent

UNITED STATES PATENTS

| | | |
|---|---|---|
| 1,817,418 | Munns | Aug. 4, 1931 |
| 2,116,150 | Howie et al. | May 3, 1938 |
| 2,169,446 | Hester | Aug. 15, 1939 |
| 2,485,793 | Vassar | Oct. 25, 1949 |
| 2,628,126 | Black | Feb. 10, 1953 |
| 2,708,045 | Shontz | May 10, 1955 |
| 2,711,259 | Jones | June 21, 1955 |
| 2,746,622 | Roy | May 22, 1956 |
| 2,750,058 | Burch | June 12, 1956 |
| 2,761,577 | Lahman | Sept. 4, 1956 |
| 2,788,908 | Lynd | Apr. 16, 1957 |